(12) United States Patent
Chang

(10) Patent No.: US 7,854,091 B1
(45) Date of Patent: Dec. 21, 2010

(54) FLOWERPOT

(76) Inventor: Hsiao-An Chang, 235 Chung-Ho, Box 8-24, Taipei County (TW)

( * ) Notice: Subject to any disclaimer, the term of this patent is extended or adjusted under 35 U.S.C. 154(b) by 0 days.

(21) Appl. No.: 12/491,230

(22) Filed: Jun. 24, 2009

(51) Int. Cl.
*A01G 27/00* (2006.01)
*A01G 27/04* (2006.01)
*A01G 9/02* (2006.01)

(52) U.S. Cl. .................................. 47/81; 47/82; 47/83
(58) Field of Classification Search ............. 47/81, 47/82, 83, 79, 65.9, 63; *A01G 27/00, 27/04, A01G 09/02*
See application file for complete search history.

(56) References Cited

U.S. PATENT DOCUMENTS

| | | | | |
|---|---|---|---|---|
| 4,380,136 A * | 4/1983 | Karpisek | ................ | 47/83 |
| 4,896,456 A * | 1/1990 | Grant | ................ | 47/67 |
| 5,095,653 A * | 3/1992 | Guldberg | ................ | 47/83 |
| 5,181,351 A * | 1/1993 | Jaecklin | ................ | 52/35 |
| 5,367,823 A * | 11/1994 | Ferris | ................ | 47/39 |
| 6,725,601 B2 * | 4/2004 | Chick | ................ | 47/83 |
| 2009/0000189 A1 * | 1/2009 | Black | ................ | 47/82 |
| 2009/0173004 A1 * | 7/2009 | Weast | ................ | 47/83 |

* cited by examiner

*Primary Examiner*—Son T Nguyen
*Assistant Examiner*—Shadi Baniani

(57) ABSTRACT

A flowerpot comprises a box body and a spacer. The buckling sheets of the spacer are buckled to the buckling recesses of the box body; and the spacer is placed upon the projection sheets and the wall assembly; a lower space and rear side of the box body below the spacer is formed with a water collecting tank and the space of the upper front side of the box body above the spacer is formed with a planting tank. In use, the hook of the spacer and the hook portion of the box body is attached to one supporting rod of a frame assembly and the two protrusions are placed upon another supporting rod. The water draining opening guides water from an upper flowerpot to a lower flowerpot. The water absorption sheets installed in the spacer can guide water from the water collecting tank to the planting tank automatically.

2 Claims, 4 Drawing Sheets

FLOWERPOT

FIELD OF THE INVENTION

The present invention relates to flowerpots, in particular to a flowerpot in which a spacer is used to separate a box body of the flowerpot into two parts, one for planting and one for collecting water. The structure of the flowerpot is simple and thus the manufacturing process for the flowerpot is easy so that the cost is lowered.

BACKGROUND OF THE INVENTION

Referring to FIGS. 4 to 5, a prior art flowerpot is illustrated, which is disclosed in U.S. patent application Ser. No. 12/234,707. In that, a flowerpot body 5 has an approximate trapezoidal shape. The flowerpot body 5 has a planting tank 50 for planting plants, a water tank 51 below the planting tank 50 for collecting water and a water guide plate 52 below the water tank 51. A filter net plate 53 is installed in the planting tank 50. The surplus water in the planting tank 50 will flow into the water tank 51 for storage. When the water in the water tank 51 is full, the water will be guided from a notch 520 in the filter net plate 53 to another planting tank of another flowerpot body. The process can be repeated from the upper side to the lower side. Thus, an upper side of the water guide plate 52 is formed with the notch 520 having a triangular shape. Each of two opposite sides of the planting tank 50 is formed with a recess 54 for receiving a water tube 8. A backside of the planting tank 50 has a hook unit 56 for hooking to a net 9 of a wall 4 so that the wall has the flowerpot body 5 of the present invention and presents with a beautiful scenery.

The soil protecting frame 6 is formed by connecting two L shape rods 60 which are arranged in parallel. In assembly, the L shape rods 60 are arranged at two openings 55 at a bottom of the flowerpot body 5. An upper end of each L shape rod 50 is formed with a hook 61. When the hooks 61 hook to the net 9, one surface of the soil protecting frame 6 will press upon the lower side of the flowerpot body 5 so as to avoid soil to drain out. Another, it has the function of supporting the flowerpot body to have a stable structure.

However the prior art has been popular in market, but there are still some defects needed to be improved.

SUMMARY OF THE INVENTION

Accordingly, the object of the present invention is to provide a flowerpot, in that a spacer is used to separate a box body of the flowerpot into two parts, one for planting and one for collecting water. The structure of the flowerpot is simple and thus the manufacturing process for the flowerpot is easy so that the cost is lowered.

To achieve above object, the present invention provides a flowerpot comprising a box body; an inner lower side of the box body being formed with a water draining opening which is enclosed by a wall assembly; an outer surface of the bottom of the box body being formed with two protrusions; a front lateral side of the box body being formed with a large notch; each of the left interior and right interior of the box body being formed with a projection sheet and a buckling recess, respectively at an upper side of the projection sheet; each of a left upper edge and right upper edge of the box body being formed with a hook portion; a spacer having an approximate U shape structure including an upper side, a middle side and a lower side; an upper side of the spacer being formed with a hook; each of a left and a right side of a middle side of the spacer being formed with a buckling sheet and a plurality of installing holes for installing water absorption sheets; a lower side of the box body being formed with a plurality of water draining holes; wherein in installation, the buckling sheets of the spacer are buckled to the buckling recesses of the box body and the spacer is placed upon the projection sheets and the wall assembly; a lower space and rear side of the box body below the spacer is formed with a water collecting tank and the space and the upper front side of the box body above the spacer is formed with a planting tank; and wherein in use, the hook of the spacer and the hook portion of the box body is attached to one supporting rod of a frame assembly and the two protrusions are placed upon another supporting rod of the frame assembly.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
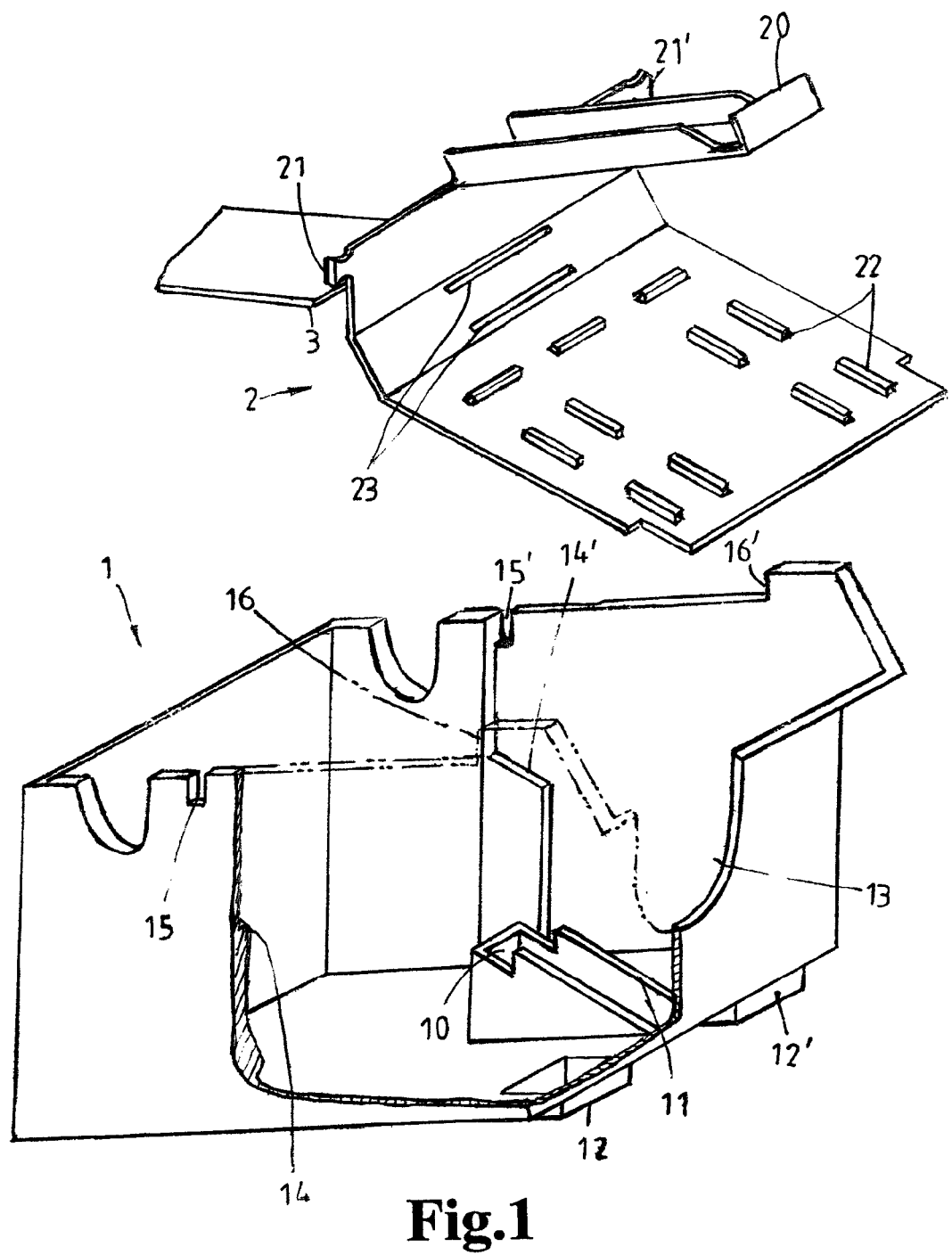
FIG. 1 is an exploded perspective view of the present invention.
Figure 3:
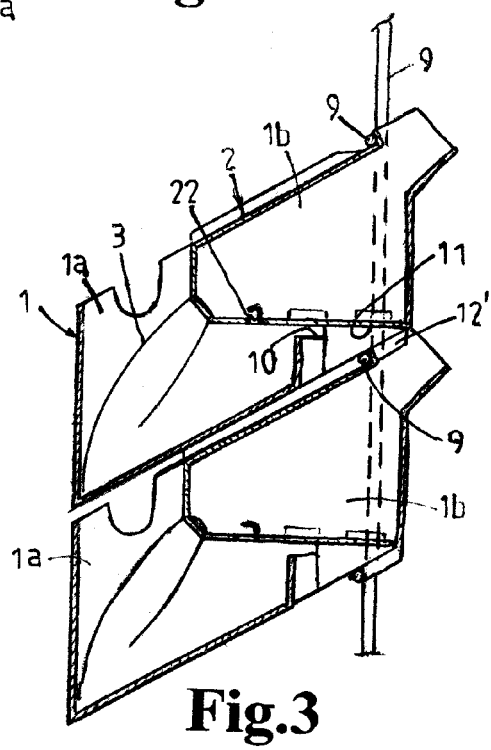
FIG. 3 shows that the present invention is installed to a frame assembly.
Figure 4:
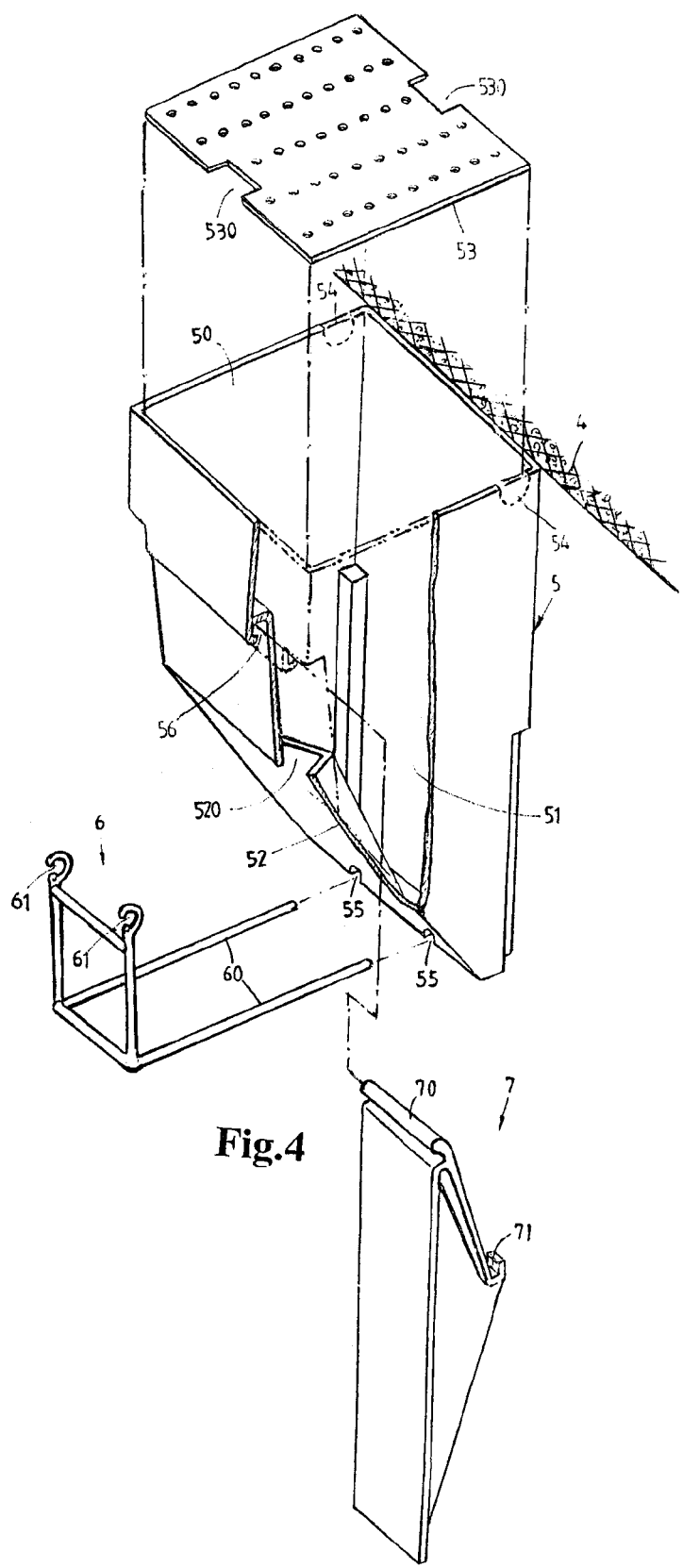
FIG. 4 is a partial cross sectional view of one prior art.
Figure 5:
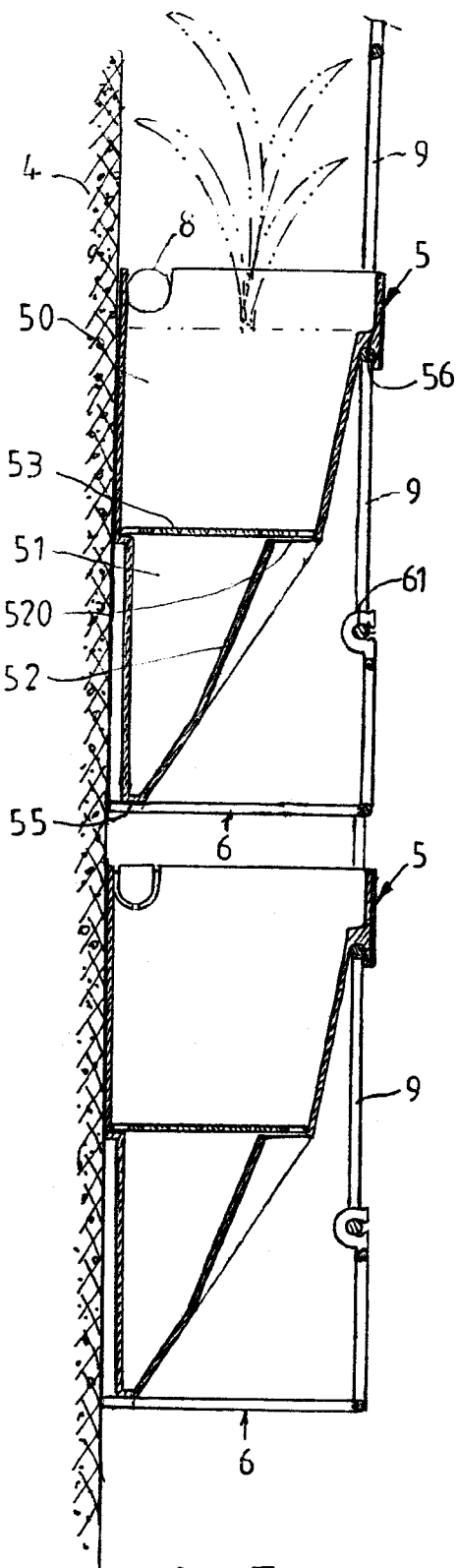
FIG. 5 is a longitudinal cross sectional view of the prior art illustrated in FIG. 4.

Referring to FIGS. 1 and 3, the flowerpot of the present invention is formed by a box body 1 and a spacer 2. An inner lower side of the box body 1 is formed with a water draining opening 10 which is enclosed by a wall assembly 11. An outer surface of the bottom of the box body 1 is formed with two protrusions (12, 12'). A front lateral side of the box body 1 is formed with a large notch 13. Each of the left interior and right interior of the box body 1 is formed with a projection sheet (14, 14') and a buckling recess (15, 15'), respectively at an upper side of the projection sheet (14, 14'). Each of a left upper edge and right upper edge of the box body 1 is formed with a hook portion (16, 16').

The spacer 2 has an approximate U shape structure including an upper side, a middle side and a lower side. An upper side of the spacer 2 is formed with a hook 20. Each of a left and a right side of a middle side of the spacer 2 is formed with a buckling sheet (21, 21') and a plurality of installing holes 23 for installing water absorption sheets 3. A lower side of the box body 1 is formed with a plurality of water draining holes 22.

In installation, the buckling sheets (21, 21') of the spacer 2 are buckled to the buckling recesses (15, 15') of the box body 1 and the spacer 2 is placed upon the projection sheets (14, 14') and the wall assembly 11. A lower space and rear side (see FIG. 3) of the box body 1 below the spacer 2 is formed with a water collecting tank 1a and the space and the upper front side of the box body 1 above the spacer 2 is formed with a planting tank 1b.

Figure 2:
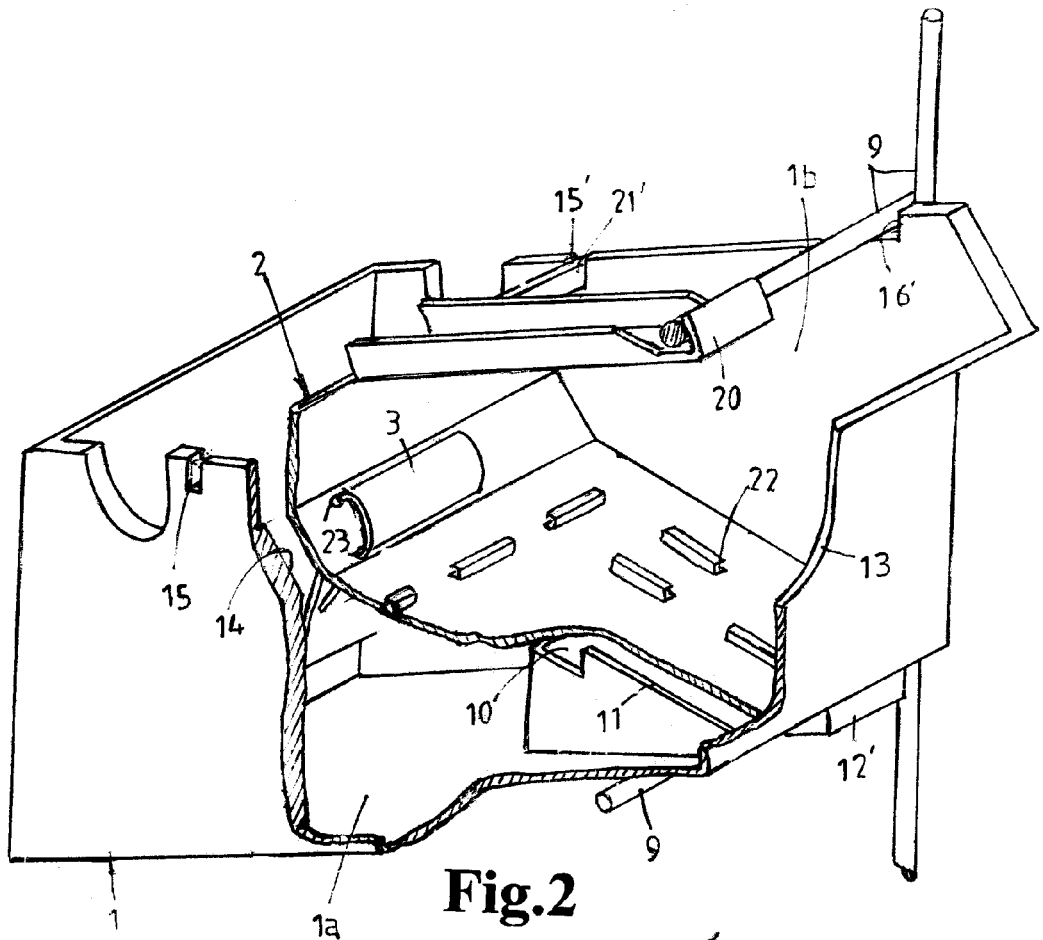
FIG. 2 is a partial cross sectional view of the present invention.

In use, referring to FIG. 2, the hook 20 of the spacer 2 and the hook portion (16, 16') of the box body 1 can be attached to one supporting rod of a frame assembly 9 and the two protrusions (12, 12') are placed upon another supporting rod of the frame assembly 9. Other than locating within the box body 1, the spacer 2 also has the function of assisting the box body 1 to buckle to the frame assembly 9 firmly. A plurality of flowerpots of the present invention can be located upon the frame assembly 9 to present a special and beautiful outlook.

The water draining opening 10 has the function of guiding water from an upper flowerpot to a lower flowerpot. The water absorption sheets 3 installed in the spacer 2 can guide water from the water collecting tank 1a to the planting tank 1b automatically by the principle of capillarity, as illustrated in FIG. 3.

Therefore, advantages of the present invention are that water can be supplied automatically and the flowerpots of the present invention are easily buckled to a frame assembly so as to present a beautiful outlook. The structures of the box body 1 and the spacer 2 are simple. The spacer 2 can be installed within the box body 1 easily and they can be easily installed to a frame body firmly. Moreover, the water absorption sheets 3 installed in the spacer 2 can guide water from the water collecting tank 1a to the planting tank 1b automatically by the principle of capillarity The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flowerpot comprising:
a box body, an inner lower side of the box body being formed with a water draining opening which is enclosed by a wall assembly; an outer surface of the bottom of the box body being formed with two protrusions; a front lateral side of the box body being formed with a large notch; each of a left interior and a right interior of the box body being formed with a projection sheet and a buckling recess, respectively at an upper side of the projection sheet; each of a left upper edge and a right upper edge of the box body being formed with a hook portion;

a spacer having an approximate U shape structure including an upper side, a middle side and a lower side; an upper side of the spacer being formed with a hook; each of a left and a right side of a middle side of the spacer being formed with a buckling sheet and a plurality of installing holes for installing water absorption sheets; a lower side of the box body being formed with a plurality of water draining holes;

wherein in installation, the buckling sheets of the spacer are buckled to the buckling recesses of the box body; and the spacer is placed upon the projection sheets and the wall assembly; a lower space and rear side of the box body below the spacer is formed with a water collecting tank; and the space formed by an upper front side of the box body above the spacer is formed with a planting tank; and wherein in use, the hook of the spacer and the hook portion of the box body is attached to one supporting rod of a frame assembly and the two protrusions are placed upon another supporting rod of the frame assembly.

2. The flowerpot as claimed in claim 1, wherein the water draining opening has the function of guiding water from an upper flowerpot to a lower flowerpot; the water absorption sheets installed in the spacer guides water from the water collecting tank to the planting tank automatically by the principle of capillarity.

* * * * *